United States Patent
Leung et al.

(10) Patent No.: US 7,454,512 B1
(45) Date of Patent: *Nov. 18, 2008

(54) METHOD OF USING LINK ADAPTATION AND POWER CONTROL FOR STREAMING SERVICES IN WIRELESS NETWORKS

(75) Inventors: Kin K. Leung, Edison, NJ (US); Kapil K. Chawla, Scotch Plains, NJ (US); Peter F. Driessen, Highlands, NJ (US); Xiaoxin Qiu, Bridgewater, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 10 days.

This patent is subject to a terminal disclaimer.

(21) Appl. No.: 11/515,242

(22) Filed: Sep. 1, 2006

Related U.S. Application Data

(63) Continuation of application No. 09/938,174, filed on Aug. 23, 2001, now Pat. No. 7,124,193.

(60) Provisional application No. 60/227,460, filed on Aug. 24, 2000.

(51) Int. Cl.
*G06F 15/16* (2006.01)
*G06F 15/173* (2006.01)
*G06F 15/177* (2006.01)

(52) U.S. Cl. ............. 709/231; 709/217; 713/300; 713/330; 713/340

(58) Field of Classification Search ......... 709/217–231; 713/300, 330, 340
See application file for complete search history.

(56) References Cited

U.S. PATENT DOCUMENTS

| | | | | |
|---|---|---|---|---|
| 5,551,057 A | * | 8/1996 | Mitra | 455/522 |
| 5,901,186 A | * | 5/1999 | Jamal et al. | 375/346 |
| 6,122,293 A | * | 9/2000 | Frodigh et al. | 370/473 |
| 6,282,209 B1 | * | 8/2001 | Kataoka et al. | 370/498 |
| 6,374,117 B1 | * | 4/2002 | Denkert et al. | 455/522 |
| 6,408,165 B1 | * | 6/2002 | Raissinia et al. | 455/69 |
| 6,519,705 B1 | * | 2/2003 | Leung | 713/300 |
| 6,690,944 B1 | * | 2/2004 | Lee et al. | 455/522 |
| 6,760,313 B1 | * | 7/2004 | Sindhushayana et al. | 370/252 |
| 6,856,812 B1 | * | 2/2005 | Budka et al. | 455/522 |
| 6,865,233 B1 | * | 3/2005 | Eriksson et al. | 375/261 |
| 6,952,181 B2 | * | 10/2005 | Karr et al. | 342/457 |
| 7,124,193 B1 | * | 10/2006 | Leung et al. | 709/231 |
| 2004/0160902 A1 | * | 8/2004 | Gronberg | 370/252 |

* cited by examiner

Primary Examiner—Haresh N Patel

(57) ABSTRACT

A method for improving the performance for a streaming service by link-adaptation and power-control in a wireless packet network such as an Enhanced General Packet Radio Services (EGPRS) cellular network is described. In particular, the effects of a combined link adaptation and power control scheme (referred to as an error-based scheme) for achieving a target error rate, which is non-zero but low enough so that limited retransmission and error concealment techniques are effective, is presented.

11 Claims, 7 Drawing Sheets

METHOD OF USING LINK ADAPTATION AND POWER CONTROL FOR STREAMING SERVICES IN WIRELESS NETWORKS

CROSS REFERENCE TO RELATED APPLICATIONS

This application is a continuation of prior application Ser. No. 09/938,174 filed Aug. 23, 2001, now U.S. Pat. No. 7,124,193, which claims the benefit of priority based on U.S. Provisional Application No. 60/227,460, filed on Aug. 24, 2000, both of which are incorporated herein by reference.

BACKGROUND OF THE INVENTION

With the advent of the third generation (3G) wireless networks, it is expected that wireless data services will become very popular soon. It is further expected that the networks will initially provide best-effort data services such as wireless Internet access. As the systems continue to evolve, a variety of streaming data applications such as encoded music, compressed video and audio programming will also be supported.

It is well known that packet voice service has a very stringent delay requirement. This stringent delay requirement precludes the possibility of retransmission in case of packet error. In addition, voice service requires a very low packet error probability in order to maintain satisfactory sound quality. However, many popular data applications such as web browsing do not have the tight delay requirements associated with voice services. As a result, retransmission based on Automatic Repeat reQuest (ARQ) procedures is applicable for certain wireless data applications. Streaming applications, such as music delivery, lie somewhere between the tight delay requirements of voice service and the virtual lack of any delay requirements of web browsing.

Given the constraints in our future wireless packet networks such as Enhanced General Packet Radio Services (EG-PRS) networks, various approaches are needed to improve the quality and capacity of a streaming application for music delivery. For this purpose, several techniques including ARQ, dynamic packet assignment, packet shuffling, SINR-based link adaptation, and random packet discarding have been utilized to improve the music quality and capacity.

Two techniques, a link-layer retransmission by use of an ARQ procedure and a packet shuffling procedure, have been proposed and used with various degrees of success to improve music quality. The link-layer retransmission technique takes advantage of the fact that the wireless network provides an option of using link level Automatic Repeat reQuest (ARQ) to create a reliable pipe for data transfer over a radio link.

The packet shuffling technique attempts to increase the effectiveness of any error concealment techniques by permitting the Advanced Audio Coder (AAC) frames to be shuffled or interleaved at the server or at an intermediate node. The assembled AAC frames are then re-ordered by the receiver and placed in a playout buffer. The purpose of this shuffling and un-shuffling is to effectively spread out bursts of AAC frame errors over a radio link. Note, however, that as long as frame numbers (or a similar index) is included in the AAC frame, it is not necessary for the mobile to even be aware of the shuffling or interleaving. This is very desirable, as it implies that this feature can be activated without changing or re-programming the mobile terminals.

The specific shuffling technique is based upon a convolutional interleaver. Two integer parameters, N and B, specify this interleaver. The values are N=6 and B=1. If T(k) denotes the position at which frame k is transmitted, then we have:

$$T(k)=k+(k \bmod N)NB \qquad (1)$$

The following table illustrates this interleaver (N=6, B=1)

TABLE I

Convolutional Interleaving for N = 6, B = 1.

| K    | 0 | 1 | 2  | 3  | 4  | 5  | 6 | 7  |
|------|---|---|----|----|----|----|---|----|
| T(k) | 0 | 7 | 14 | 21 | 28 | 35 | 6 | 13 |

Therefore, the order of transmission of the frames is 0, 7, 1, 14, 8, 2, 21, 15, 9, 3, 28, 16, 10, 4, 35, 29, 17, 11, 5, 42, 36, . . . . By way of this technique two consecutive frames are separated by at least NB frames after the shuffling. (This statement is not applicable for a few initial frames, i.e., when the interleaver begins operation. However, this has a minimal impact on performance for reasonable sized files.) Accordingly, this technique is very effective in shortening gaps in the received AAC frame sequence that result from a burst of over-the-air transmission errors. On the other hand, this shuffling introduces a delay in the transmission of some frames, and therefore comes at a price of increasing the effective playout delay (or equivalently, the buffer size). More importantly, the packet shuffling requires changes and inclusion of shuffling operations on the music service. The packet shuffling technique is an application layer method. To avoid the needed changes for other streaming services, it would be desirable to have a generic method of improved performance for streaming services as part of the network operations and control in a wireless network which provides acceptable music quality as well as capacity.

SUMMARY OF THE INVENTION

A method for improving the performance for a streaming service by link-adaptation and power-control in a wireless packet network is described. In particular, the effects of a combined link adaptation and power control scheme (referred to as an error-based scheme) for achieving a target error rate, which is non-zero but low enough so that limited retransmission and error concealment techniques are effective, is presented.

The presently disclosed method provides noticeable improvement of music quality as compared to known throughput-based schemes that intend to maximize throughput regardless of packet error performance. The streaming nature of the applications requires the packet error probability to be less than a certain target, which is less stringent than the requirement for a voice service. In addition, most streaming applications allow data buffering with a modest delay before presenting it to users, thus a limited number of retransmissions are feasible. Furthermore, error concealment techniques are applied to the buffered data to reduce the impacts of missing packets on service quality. The presently disclosed error-based scheme is able to increase the link throughput over the throughput-based scheme by 66.7% in one embodiment. These results reveal that the presently disclosed error-based scheme when used to achieve required error targets is helpful in improving quality and capacity for streaming data applications. Additionally, the presently disclosed error-based scheme maintains the error rate at a satisfactory level which is instrumental in maintaining service quality. In a preferred embodiment the present technique is utilized for delivering MPEG-4 Advanced Audio Coder (AAC) coded music in an Enhanced General Packet Radio Services (EG-PRS) network.

BRIEF DESCRIPTION OF THE DRAWINGS

The invention will be better understood by reference to the following more detailed description and accompanying drawings in which.

DETAILED DESCRIPTION

Figure 1:
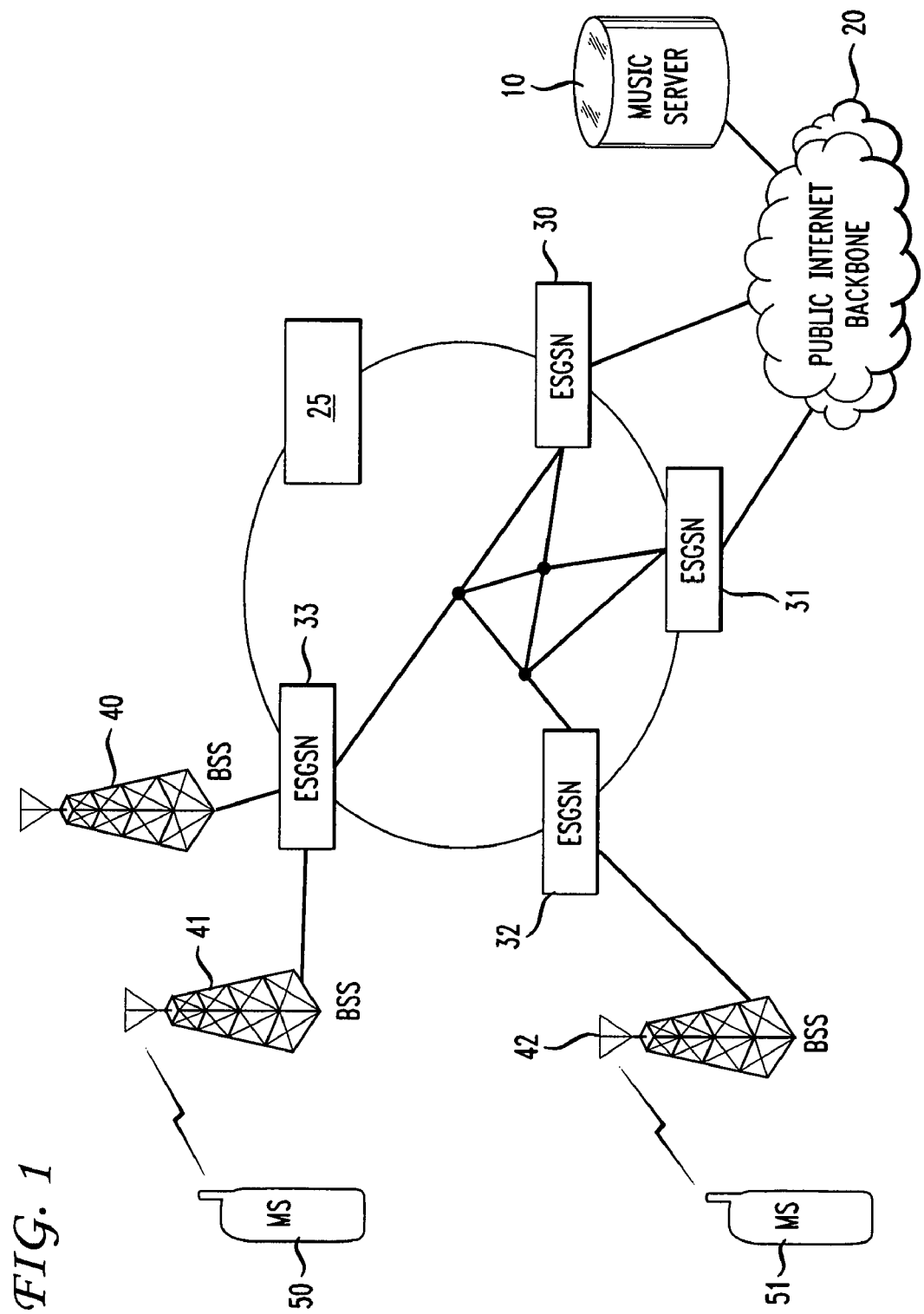
FIG. 1 is a diagram of a system used to implement the presently disclosed method.

The MPEG-4 AAC offers high quality audio with data rates in the range of 32 Kbps to 128 Kbps for two-channel stereo. For example, in an EGPRS network, depending on the radio condition, the data rate for each time slot (of a total of 8 slots per GSM TDMA frame) can range from about 11 Kbps to about 65 Kbps. The high end of the data rate is adequate for the MPEG-4 music. The error performance for MPEG-4 music is improved by the presently disclosed error-based method of utilizing link adaptation and power control with a goal of achieving a target error performance.

Link adaptation adapts the modulation and coding levels of the signal according to the channel and interference conditions. For best-effort data services, the link adaptation technique is designed to maximize the overall network throughput. However, for real-time services, different link-adaptation techniques are needed to deliver at target error performance. Unlike the prior art methods where the link is adapted according to the measured error statistics, in the presently disclosed method, the link adaptation is based on the relationship between error rate and signal-to-interference-plus-noise ratio (SINR). The operations of this method are not to maximize the network throughput but rather the objective of the present link-adaptation technique is to achieve a target error probability needed for the music service. The chosen target is non-zero but is kept below a certain value so that limited retransmission and error concealment techniques can work effectively to maintain music quality.

Power control is a technique for combating and managing interference in cellular networks. Power control adjusts transmission power to a level just enough for achieving a desirable performance. Effectively combining power control with link adaptation is a difficult process. Specifically, without knowing the transmission power beforehand, the SINR cannot be predicted, which is needed for choosing the appropriate modulation/coding level. In turn, without knowing the modulation level, the transmission power cannot be adjusted accordingly. The approach utilized in the present method assumes that the maximum transmission power is used for predicting the SINR. A Kalman-filter method is employed to continuously track the (co-channel) interference power. The signal path gain between a transmitter and its associated receiver are also estimated based on the control channel operations in the wireless network. Thus, the SINR is predicted from the path gain, the maximum power, and the predicted interference power. The predicted SINR is used as an input to adapt the link. Once the modulation level is selected, the power is further re-fined to meet the SINR target associated with the selected modulation level. In aiming at the given SINR targets, the power control helps reduce the variance of error rates, and this is important in maintaining the perceived music quality. By utilizing the combined link adaptation and power control scheme for achieving a target error rate the error performance at the EGPRS block and the AAC frame level is enhanced.

Referring now to FIG. 1, a simplified architecture used with the presently disclosed method is shown. An AAC music server 10 is in communication with a data network 20, e.g., the Internet. The EGPRS network 25 uses the Enhanced Gateway GPRS Support Node (EGGSN) 30-33 to act as a logical interface with the external data network. The EGPRS network 25 supports transport of IP packets and consists of a set of Enhanced Serving GPRS Support Nodes (ESGSN's) 30-33, which are mobility-aware routers, and base-station systems (BSS's) 40-42 connected to the serving nodes. Music data requested by mobile user (or mobile station, MS) 50-51 is delivered from the server, through the serving nodes and the associated BSS, and finally transmitted to the users over the radio link. The air interface for the EGPRS network is based on TDMA, packet-switched radio technology with 200 KHz channels. The air interface is also known as the Enhanced Data rates for GSM Evolution (EDGE). For this reason, the terms EGPRS and EDGE are used interchangeably here. To transport data between the EGPRS serving nodes and the mobile users, two types of bearers are used. Packet bearers and circuit-switched bearers are used, which are targeted for "connection-less" and "connection-oriented" data transfer, respectively. The two types of bearers have different physical and link layer structures, and cannot be easily combined on the same radio channel. Thus, for integrated music and data services, the transmission of music is provided over packet-switched bearers.

The EGPRS employs a link-adaptation technique to adapt the modulation and coding level (which is referred to as transmission mode below) for each link according to its radio and interference conditions. For each link the adaptation occurs once every 100 msec. Information bits are grouped into EDGE radio blocks, each of which are transmitted in four bursts (i.e., in the same time slot of four consecutive TDMA frames). Depending on the transmission mode, the number of information bits varies from one block to another. As a result of such adaptation, the data rate of a link can vary from about, 11 Kbps to about 65 Kbps. In most cases, one AAC frame (packet) cannot fit into one radio block. Therefore, AAC frame segmentation at the base station and frame re-assembly at the mobile terminal is necessary.

Audio coders such as MPEG-4 Advanced Audio Coder (AAC) are used to hide quantization noise below the signal-dependent masking thresholds of the human auditory system. With AAC, the audio stream is divided into subbands using a filter bank, which uses a 1024 point Modified Discrete Cosine Transform (MDCT). Quantization noise (step size) is set separately in each subband to fall below the masking threshold. In addition, correlation between audio samples is used to remove redundancies. The raw data produced by the AAC encoder is parsable so that it can be used with any data transport mechanism, including digital cellular air interfaces such as the EDGE system. The perceived audio quality is a function of this AAC raw data rate, which depends on the audio sampling rate and the compression rate. Typical AAC parameters are summarized in Table II, assuming an average compression ratio of 16:1, i.e., from 16 to 1 bit per sample on average and two audio channels for stereo. The AAC frame lengths for each channel is variable from frame to frame, depending on the music source, with an average of 1024 bits per frame (exactly 1024 samples per frame times an average of 1 bit per sample) per channel. Since each AAC frame is generated based on 1024 samples, the time period between two successive AAC frames is determined by the audio sample rate. For example, when the sample rate is 48 KHz, the frame time is 21.3 (=1024/48) msec as shown in the table. The AAC frames that use the 1024 point MDCT (so-called long frames) are used when the music is stationary over the frame transmission time. So-called short frames are used when the audio changes rapidly within the frame transmission time, in which 8 consecutive 128 point MDCTs are used, thus sacrificing frequency resolution to capture the time dynamics. These short frames cannot be predicted from surrounding long frames, and thus are designated high priority AAC frames.

TABLE II

AAC Data Rate and Music Quality

| Highest audio freq. (KHz) | Audio Sample rate (KHz) | Bits per sample per channel | Stereo Data Rate (Kbps) | Quality | AAC frame time (msec) |
|---|---|---|---|---|---|
| 24 | 48 | 1 | 96 | CD | 21.3 |
| 16 | 32 | 1 | 64 | FM | 32 |
| 12 | 24 | 1 | 48 |  | 42.7 |
| 8 | 16 | 1 | 32 |  | 64 |
| 6 | 12 | 1 | 24 | AM | 85.3 |

The nth consecutive AAC frame in a given channel has a limited useful lifetime, comprising the startup (playout) delay plus n times the time per frame. If it is delayed beyond its lifetime, the AAC frame has to be dropped. For a given data rate, the audio quality is determined by the number and distribution of gaps in the AAC frame sequence at the receiver, where the gaps are caused by frames that cannot arrive on time due to transmission error. As a result, the distribution of AAC frame error rate plays an important role in defining the music quality. The gaps in AAC frames are concealed using error mitigation techniques in which a prediction or interpolation algorithm is used to estimate the missing frame and thus fill the gap left by the missing frame.

The performance of the error concealment schemes is best when only one or just a few consecutive AAC frames are missing. For most types of music it may be difficult to mitigate a gap of more than 3 AAC frames (192 msec at 32 Kbps) and still maintain acceptable audio quality. MPEG-4 AAC includes additional error robustness tools, which allow partially damaged AAC blocks to be reconstructed, as well as a more finely scalable data rate.

In one proposed setting for the EGPRS network, the adaptation technique adapts each link to one of six modulation/coding levels (or six modes). Based on the predicted SINR, the modulation level is chosen according to Table III, which lists the thresholds for the prior art throughput-based scheme.

TABLE III

SINR Thresholds for Maximizing Throughput

| Mode level | 1 | 2 | 3 | 4 | 5 | 6 |
|---|---|---|---|---|---|---|
| Lower SINR | — | 4 | 10 | 11 | 13 | 21 |
| Upper SINR | 4 | 10 | 11 | 13 | 21 | ∞ |

Figure 2:
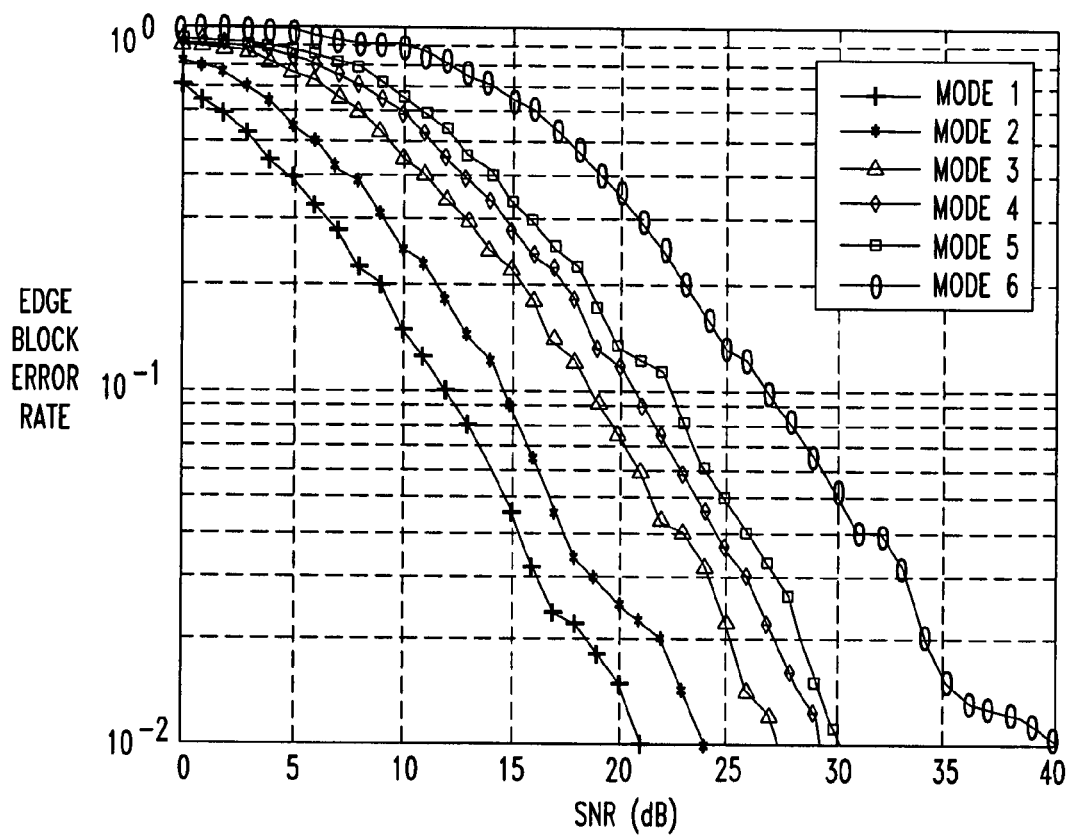
FIG. 2 is a set of typical block error probabilities as a function of SINR for various transmission modes.

For example, when the predicted SINR is greater than 11 dB, but less than or equal to 13 dB, mode 4 is chosen for the transmission. Thresholds in the table are adopted for maximizing network throughput. A set of typical block error probabilities as a function of SINR for various transmission modes are shown in FIG. 2. For a given error target, the selection thresholds for link adaptation are determined from this set of curves. As an example, the thresholds in Table IV for the presently disclosed error-based scheme are obtained to yield an approximate error rate of 15%.

TABLE IV

SINR Thresholds for Error Performance

| Mode level | 1 | 2 | 3 | 4 | 5 | 6 |
|---|---|---|---|---|---|---|
| Lower SINR | — | 10 | 13 | 17 | 19 | 20 |
| Upper SINR | 10 | 13 | 17 | 19 | 20 | ∞ |

The thresholds are chosen to target at a specific error performance. Note that a difference between the prior art throughput-based technique and the presently disclosed error-based technique is that the thresholds in Table III are lower than those in Table IV. As a result, higher transmission modes are used more often by the throughput-based adaptation than by the error-based method. The throughput-based scheme typically yields a higher throughput than the error-based approach. On the other hand, the present method provides lower error probability than the throughput-based method does. This is a desirable characteristic of the error-based adaptation for real-time services such as streaming music.

As described above the present method applies a Kalman-filter method to predict interference power for predicting SINR and adjusting transmission power. Using this method, each terminal continuously measures the interference power for its assigned radio channel (e.g., the same time slot of the consecutive TDMA frames), regardless of whether or not the base station associated with the terminal is transmitting data and whether or not the data being transmitted is intended for the terminal. The measurements are fed into a Kalman filter to predict future interference power. Let $\tilde{i}_n$ and $\tilde{I}_n$ denote the predicted interference power for frame n in mW and dBm, respectively. The time and measurement update equations for the Kalman filter for interference predictions are:

$$\tilde{I}_{n+1} = \hat{I}_n \quad (2)$$

$$\tilde{P}_{n+1} = \hat{P}_n + Q_n \quad (3)$$

$$K_n = \tilde{P}_n(\tilde{P}_n + R_n)^{-1} \quad (4)$$

$$\hat{I}_n = \tilde{I}_n + K_n(Z_n - \tilde{I}_n) \quad (5)$$

$$\hat{P}_{n+1} = (1 - K_n)\tilde{P}_n \quad (6)$$

where $\tilde{I}_n$ and $\hat{I}_n$ are the a priori and a posteriori estimate of interference power in dBm for frame n, $\tilde{P}_n$ and $\hat{P}_n$ are the a priori and a posteriori estimate of error variance, $K_n$ is the Kalman gain, and $Q_n$ and $R_n$ are the variance for the process noise (i.e., the change of interference power of one frame relative to the previous one) and the interference measurement noise, respectively.

$Z_n$ and $\bar{Z}_n$ are the measured interference power for frame n and the average interference over the last W frames prior to frame n, respectively.

$$\bar{Z}_n = \frac{1}{W} \sum_{i=n-W+1}^{n} Z_i \quad (7)$$

$Q_n$ is estimated by $$Q_n = \frac{1}{W-1} \sum_{i=n-W+1}^{n} (Z_i - \bar{Z}_n)^2 \quad (8)$$

Note that $R_n$ depends on the actual error characteristics of interference measurements. $R_n$ is given by $$R_n = \eta Q_n \quad (9)$$

where $\eta$ is a given constant, typically between 0 and 1.

With the predicted interference $\tilde{i}_n$ in mW from (2), the SINR for frame n is estimated by $$SINR = \frac{P_{max} g_n}{\tilde{i}_n} \quad (10)$$

where $P_{max}$ is the maximum power and $g_n$ is the signal path gain between the transmitter and the intended receiver for frame n (which can be estimated and known to both transmitter and receiver by use of control channel associated with handoff purposes in the EDGE system). Then, the predicted SINR is used in the link adaptation procedure to choose the transmission mode discussed above. Transmission power other than maximum $P_{max}$ could be used for predicting SINR in the above equation, which may yield further performance gain. In addition, the predicted interference $\tilde{i}_n$ can also used to control transmission power $P_n$ for frame n:

$$P_n = \min\left[\frac{\gamma^* \tilde{i}_n}{g_n}, P_{max}\right] \quad (11)$$

where $\gamma^*$ is the SINR target associated with the adapted transmission mode (which is chosen to be the upper SINR value in Table IV for the adapted mode, with an exception that for mode 6, $\gamma^*$ is set to be 25 dB). By aiming at the SINR target, the power control not only attempts to achieve the associated error rate, it also helps reduce the variance of error rates among users or terminal locations. It is worth noting that the power control represents a closed-loop control that requires exchange of control information between the receiver and the transmitter. Such information exchange can be made possible by including pertinent information in appropriate control messages in the EDGE system. For downlink transmission of music data, the receiving terminal continuously measure interference power and send the measurements to the BSS in the control messages. The computation associated with the Kalman filter can be performed by the base station. Finally, the base station transmits at the power level $p_n$ in Eq. (11) for each frame n.

A simulation was done on an EGPRS network with a total of 37 cells in a traditional hexagonal layout. Each cell is divided into three sectors, each of which is served by a base-station antenna at the center of the cell. The 3-dB beamwidth of each base-station antenna is 60 degrees, while mobile terminals have omni-directional antennas. The radiation pattern for the base-station antenna is assumed to be a parabolic shape. That is, a 3 dB drop occurs at the 30-degree angle and any direction beyond a threshold angle in clockwise or anti-clockwise direction suffers a fixed attenuation relative to the gain at the front direction, which is called the front-to-back (F/B) ratio. The F/B ratio is 25 dB for the base-station antenna. Frequency reuse factor of ⅓ (i.e., the available spectrum is divided into 3 frequency sets and they are re-used in every cell) is assumed. Each radio link between a terminal and a BS antenna is characterized by a nominal propagation model with an exponent of 3.5 and lognormal shadow fading with a dB standard deviation of 6. Cell radius is assumed to be 1 Km and the median path loss at 100 m from the cell center is set to −73 dB. Thermal noise at each receiver is fixed and equal to −116 dBm, which corresponds to the 200 KHz GSM channel with 5 dB noise factor. Transmission power can vary between 1 to 30 dBm.

Since the simulation was implemented to study the performance improvement by the error-based adaptation and power control, only one downlink channel (i.e., use of one of 8 time slots in the GSM TDMA frame) shared by all music and data users, is considered in the model to reduce simulation time. In reality, a terminal can move from place to place while receiving music data. To study the improvement of music quality due to the link-level techniques, the aggregated error improvement for a large number of moving terminals under different traffic load conditions would have to be examined. Instead, an alternative approach was used. Each sector is populated with 100 terminals randomly, each of which selects the BS that provides the strongest signal power. It was assumed that all terminals remain at the fixed locations. To capture the effects of mobility, terminals in the same sector take turns in a random fashion to be the recipient of the data being transmitted by the BS. After receiving data for an average of 0.6 second, either the channel remains idle for a random period of time or another terminal in the sector is selected to be the next recipient. The idle time has a geometric distribution and its average is determined to match a given traffic load. The 0.6-second duration is chosen because the time constant for changes of shadow fading for moving terminals and interference power in the packet-switched network is on this order of magnitude. Specifically, based on the EDGE data rates, the amount of time required for transmitting a typical IP packet is about 0.6 second on average. This way, the overall error statistics for all terminals is used to approximate the expected error performance for a randomly selected, moving terminal.

A radio block is the basic transmission unit of the EDGE system. For each block transmission, the SINR is measured at the receiving end, which in turns depends on the path loss, shadowing and interference power. The SINR measurement is rounded to its closest integer in dB and the block error state (good or bad) is determined based on the SINR value the adapted transmission mode, and the corresponding error probabilities in FIG. 2. (Note that Rayleigh fading is included in the link performance curves.) When power control is used, the SINR target $\gamma^*$ in equation 11 is chosen to be the upper SINR values for the adapted transmission mode in Table IV, with an exception that for mode 6, the target is set to be 25 dB.

As discussed earlier, each AAC frame is divided into a number of EDGE blocks, each of which is sent over the radio link. Each AAC frame has a useful lifetime and a frame is in error if any of its blocks either arrives too late, or is received in error after retransmission for a pre-specified number of times.

The ultimate, perceived music quality is characterized by the AAC frame error rate (FER). In particular, the FER over a one-second sliding window is used as a measure of quality. In addition to considering AAC FER, results were also obtained to show the performance improvement by the error-based adaptation and power control at the EDGE block level. They are needed because the latter provides additional insights into the performance improvement. As discussed above, an error at the EDGE level may be mitigated by the ARQ procedure before presenting the associated AAC frame to the user. In addition, packet shuffling at the AAC frame level help randomize the errors among various AAC frames so that error concealment techniques can be effective in maintaining music quality in case of missing frames.

Figure 3:
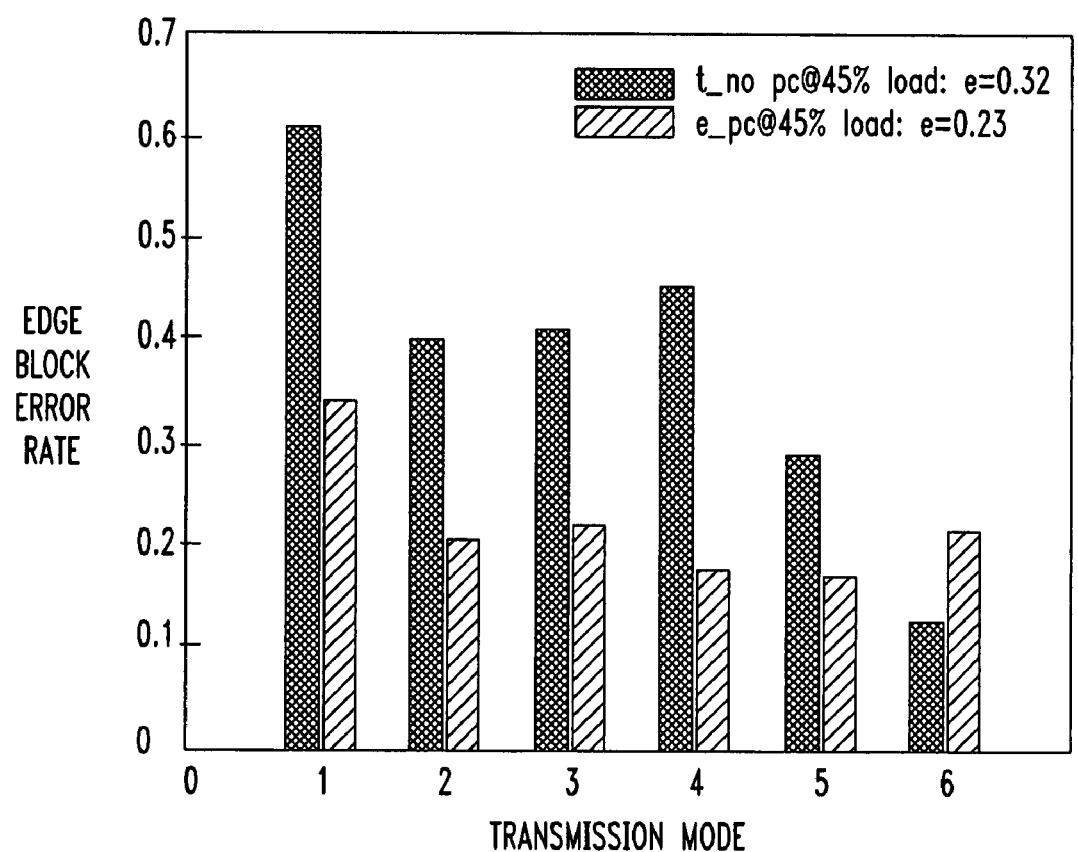
FIG. 3 is a graph of the EDGE block error rate for all six transmission modes for the throughput-based adaptation.

FIG. 3 shows the EDGE block error rate for all six transmission modes for the throughput-based adaptation with no power control and the error-based adaptation with power control, which are labeled for brevity as "t_no pc" and "e_pc" cases in the figure, respectively. This figure assumes that the downlink channel is loaded with 45% offered traffic, excluding ARQ retransmissions. Two observations can be made from these results. First, the EDGE block error rate for the throughput-based and error-based scheme is about 32% and 23%, respectively. Although not shown in the figure, their corresponding average throughput is 31.9 and 26.3 Kbps, respectively. The throughput-based scheme offers a higher throughput than the error-based method. However, the latter provides better error performance than the former. Second, the error rates for various transmission modes under the throughput-based scheme have a higher variability than those for the error-based scheme. As intuitively expected, except for mode 1 (i.e., the most robust modulation and coding), the error rate for all other modes generally fall between 15 to 20% under the error-based adaptation as the SINR thresholds are selected to yield a target error of 15% in Table IV. The relatively higher error rate for mode 1 is due to a fact that it is used for transmission even when the link quality is extremely poor. In this case, there is no "guarantee" of error performance for the lowest mode. For the throughput-based scheme, the error rate for transmission modes 5 and 6 are noticeable lower than that for other modes because when the high modes are used for transmission, the link quality is usually good for correct reception. This disparity results into a high variability of error rate for various modes. In essence, the error-based scheme has achieved the goal of reducing the variance of error rate. Such improvement at the EDGE block level can help maintain the music quality at the AAC frame level.

Figure 4:
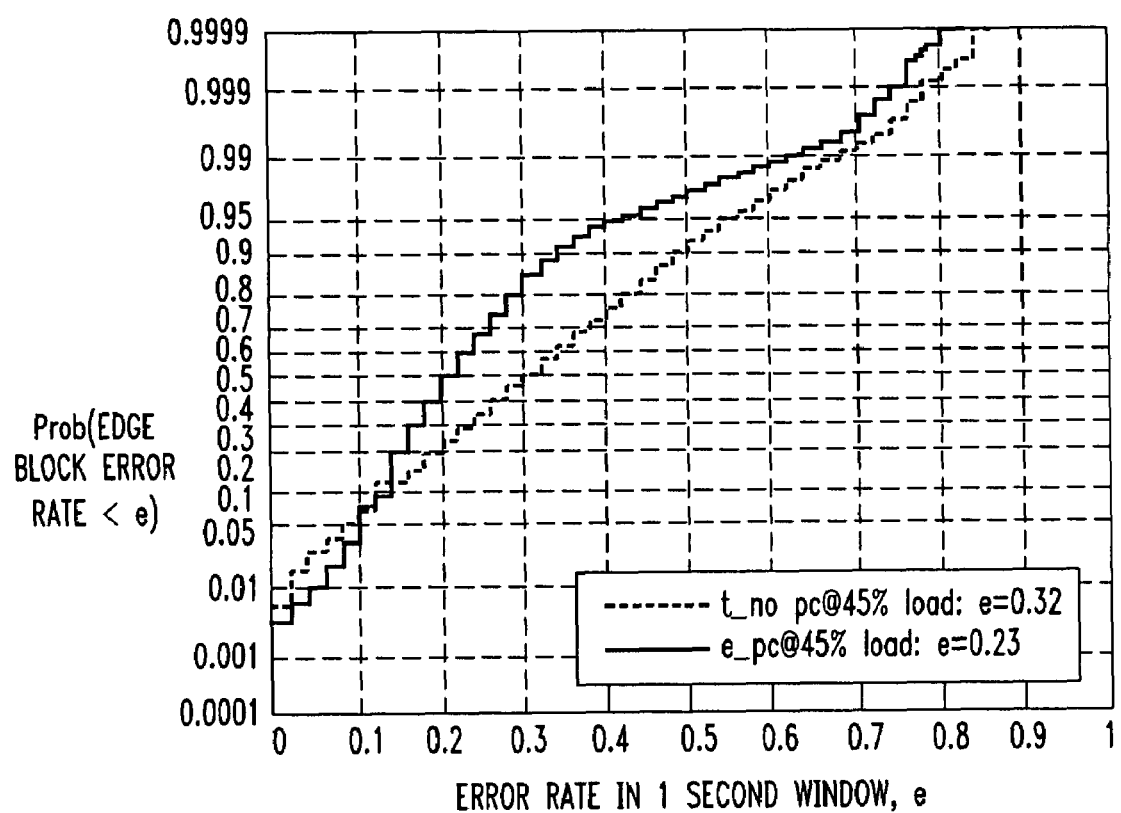
FIG. 4 is the cumulative distribution function (CDF) of EDGE block error rate over a sliding window of 1 second with the traffic load of 45%.

FIG. 4 presents the cumulative distribution function (CDF) of EDGE block error rate over a sliding window of 1 second with the traffic load of 45%. As shown in the figure, except for a percentile of less than 5%, the error-based adaptation with power control yields better error performance at the EDGE block level than the throughput-based adaptation with no power control. Evidently, the crossover at about 5-percentile error rate is due to the fact that the power control limits the transmission power for few terminal locations with excellent link quality, while the throughput-based scheme continues to transmit at full power to those locations. As a result, the error rate at those locations is lowered for the throughput-based scheme. Nevertheless, the associated link quality at those locations is already excellent. Transmitting at less than the maximum power level can degrade the error performance a little bit.

Recall that each AAC frame is segmented into a number of fully and partially filled EDGE blocks. A reception error for an EDGE block may be mitigated by the ARQ procedure and packet shuffling helps randomize the distribution of AAC frame errors. Corresponding to FIG. 4, the CDF for the number of AAC frame errors over a sliding window of 1 second is presented in FIG. 5. These results reveal a substantial error improvement for the error-based scheme over the throughput-based scheme at the AAC frame level. Specifically, the 91st percentile of the number of AAC frame errors in the one-second window is reduced from three for the throughput-based scheme to one by the error-based scheme. Such a reduction in error rate translates into a noticeable improvement of music quality.

Figure 5:
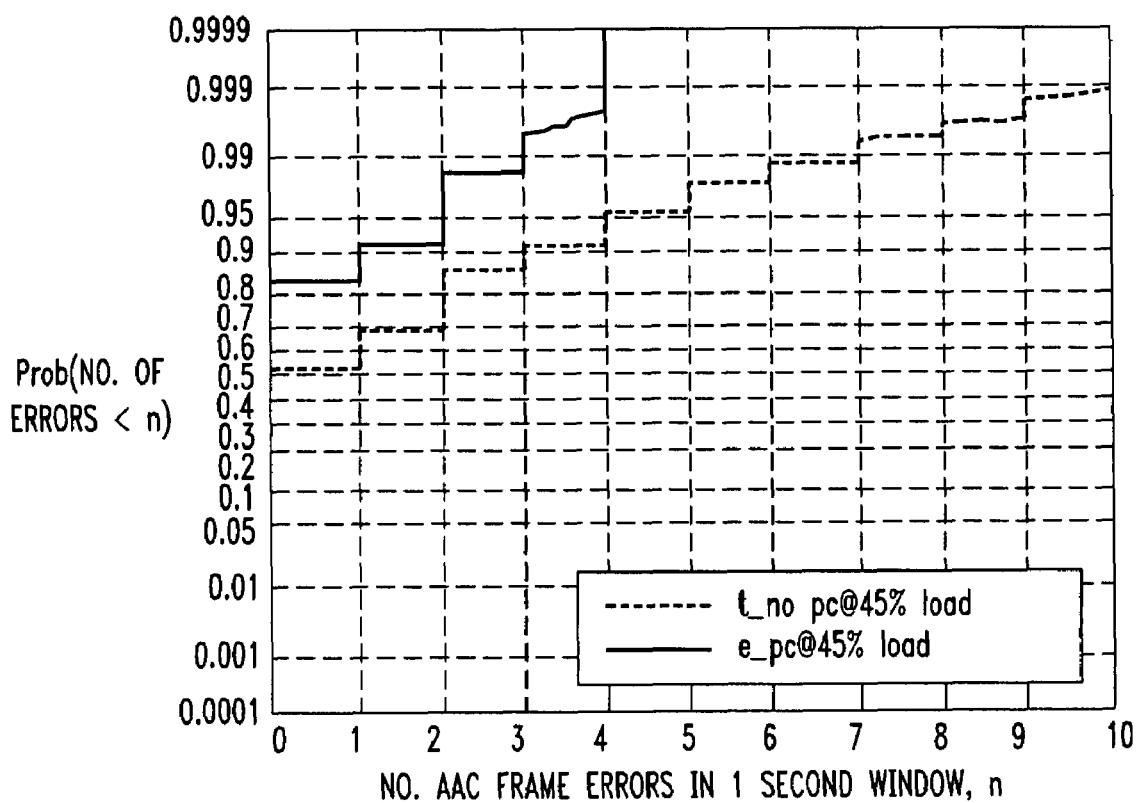
FIG. 5 is the CDF for the number of AAC frame errors over a sliding window of 1 second.
Figure 6:
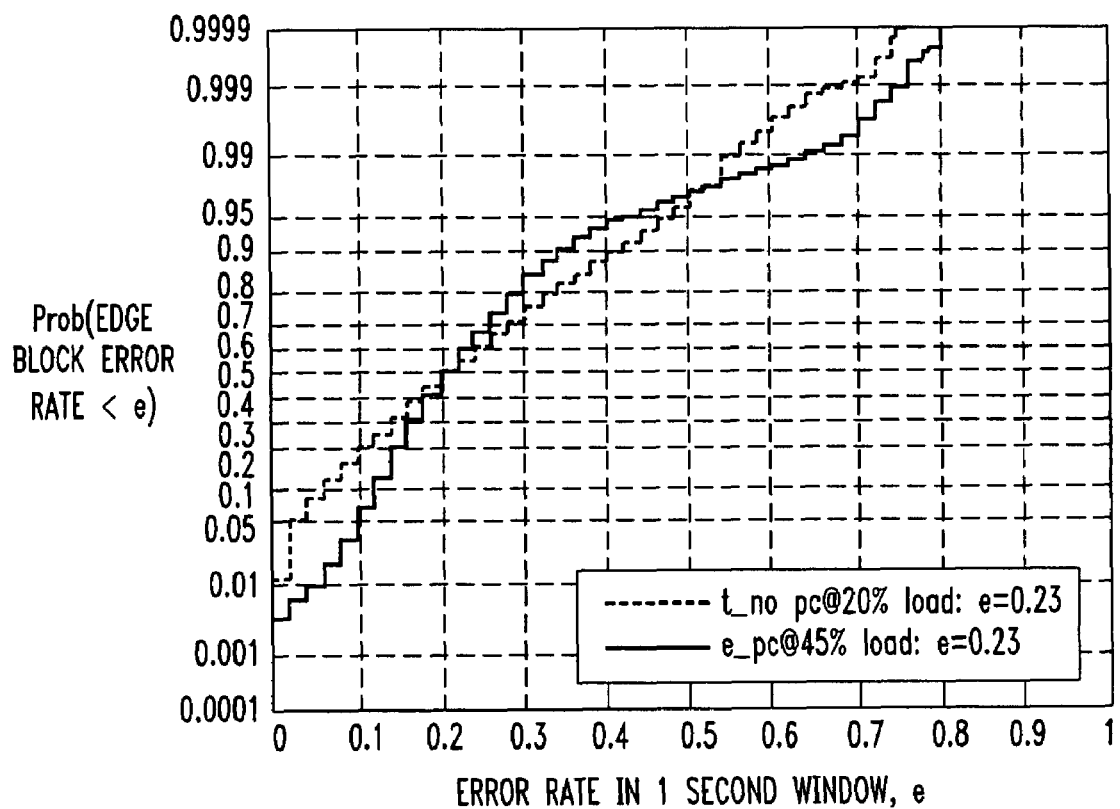
FIG. 6 is a graph comparing the CDF for the EDGE block error rate for the throughput-based scheme with that for the error-based scheme.
Figure 7:
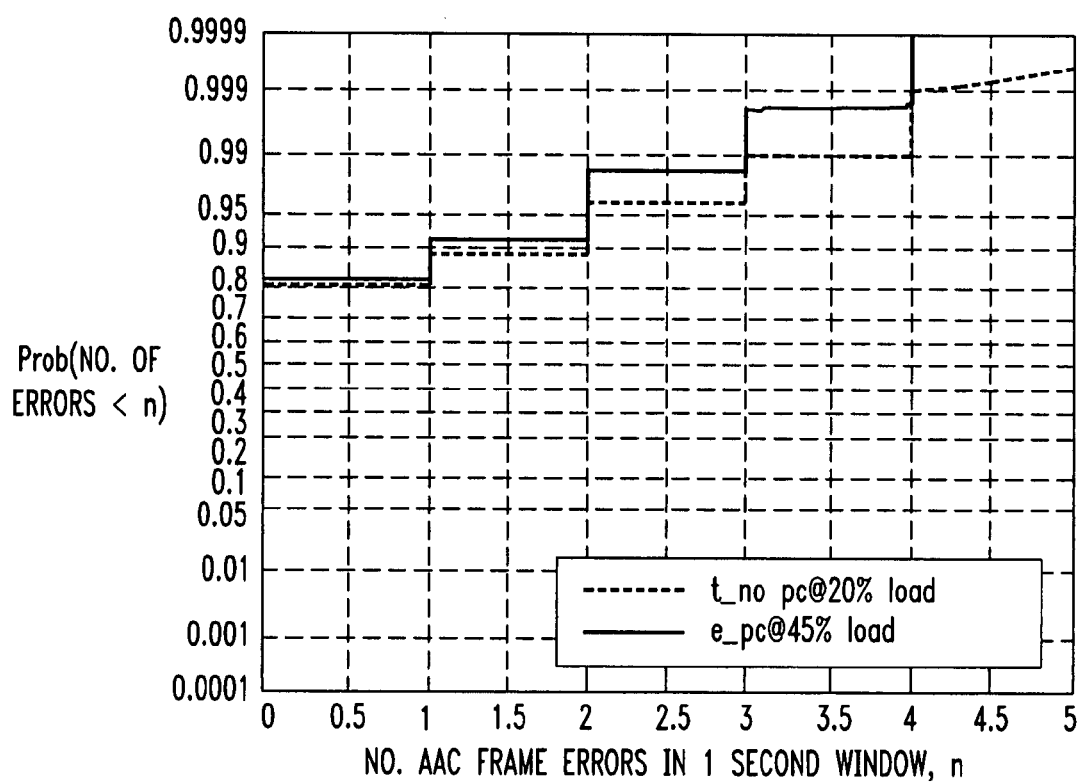
FIG. 7 is a graph the CDF's for the number of AAC frame errors in a one-second window.

FIGS. 3 to 5 present the error improvement for the error-based scheme for a given traffic load and this improvement translates into an increase in network capacity. Referring now to FIGS. 6 and 7 the CDF for the EDGE block error rate for the throughput-based scheme is compared with original traffic load of 20% to that for the error-based scheme with 45% traffic in FIG. 6. Despite the difference in offered traffic, both schemes yield an error rate of about 23% averaged over a relatively long period of time. However, in terms of number of EDGE block errors in the one-second sliding window, the CDF's in the figure show that depending on the error percentile, one scheme can perform better or worse than the other. Nevertheless, for 50th or lower percentile, and 97th or higher percentile, the error-based scheme yields a higher block error rate than the throughput-based scheme does. The opposite is true between 50th to 97th percentiles.

The CDF's for the number of AAC frame errors in a one-second window in FIG. 7 provide a better understanding of the improvement seen by the presently disclosed method. Results in the latter figure reveal that the error-based scheme yields slightly better AAC frame error rate than the throughput-based scheme. Specifically, the probability of having at most 2 AAC frame errors in a one-second window is about 98% and 96% for the error and throughput-based scheme, respectively. Therefore, to provide similar music quality, the error-based scheme can effectively support an offered traffic load increased from 20% for the throughput-based scheme to 45%. Although not shown in the figure, the associated throughput (i.e., average data rate times link utilization) is about 10.2 Kbps and 17 Kbps for the 20% and 45% load cases, respectively. Thus, the error-based scheme in effect yields a throughput increase of 66.7% over the throughput-based scheme.

In view of the above, the error-based scheme of the present method provides noticeable improvement of music quality over the throughput-based scheme when offered with similar traffic load. The link adaptation and power control technique utilized to achieve error targets are helpful in improving quality and capacity for streaming data applications such as music delivery where error performance is crucial in maintaining service quality.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

What is claimed is:

1. A method of providing streaming service in a wireless packet network comprising steps of:
utilizing a link adaptation technique to adapt a modulation and coding level to achieve a predetermined error rate for transmission of data packets, said link adaptation technique based on a relationship between said error rate and a signal-to-interference-plus-noise ratio, wherein said signal-to-interference-plus-noise ratio is estimated by multiplying a value of a maximum transmission power level by a value of a signal path gain and dividing by a value of a predicted interference power level;
utilizing a power control technique to adjust a transmission power to a level which provides desirable performance, said power control technique utilized in combination with said link adaptation technique and based on the adapted modulation and coding level; and
transmitting said packets of data in accordance with said modulation and coding level and with said transmission power.

2. The method of claim 1 wherein said streaming service comprises a music delivery service.

3. The method of claim 1 wherein said streaming service is provided over a cellular network.

4. The method of claim 1 wherein said predetermined error rate comprises a non-zero error rate.

5. The method of claim 1 wherein said streaming service is provided over packet-switched bearers.

6. The method of claim 1 further comprising the step of applying error-concealment techniques to said data packets at a receiving end.

7. The method of claim 1 wherein said step of utilizing a link adaptation technique is performed at periodic intervals.

8. The method of claim 1 wherein said step of utilizing a power control technique is performed at periodic intervals.

9. The method of claim 2 wherein said music delivery service comprises a MPEG-4 Advanced Audio Coder music service.

10. The method of claim 3 wherein said cellular network comprises an Enhanced General Packet Radio Service cellular network.

11. The method of claim 1, wherein said transmission power level is determined from a value of said signal-to-interference-plus-noise ratio multiplied by a value of said predicted interference power level divided by a value of said signal path gain.

* * * * *